United States Patent Office 3,493,606
Patented Feb. 3, 1970

3,493,606
TRANS-ISOMERS OF 1-(LOWERALKYLAMINO-ALKOXY) - PHENYL - 1,2 - DIPHENYL-2-HALO-ETHYLENES AND THE SALTS THEREOF
Dora Nellie Richardson, Macclesfield, Cheshire, England, assignor to Imperial Chemical Industries Limited, London, England, a corporation of Great Britain
No Drawing. Filed May 22, 1967, Ser. No. 640,365
Claims priority, application Great Britain, June 20, 1966, 27,483/66
Int. Cl. C07c 91/16, 91/28
U.S. Cl. 260—501.18       3 Claims

ABSTRACT OF THE DISCLOSURE

Cis and trans isomers of 1-(aminoalkoxy)phenyl-1,2-diphenylhaloethylene derivatives. Both the cis and trans isomers are capable of preventing implantation of the fertilised ovum, but the cis isomers also exhibit oestrogenic activity.

---

This invention relates to alkene derivatives which have useful pharmacological properties.

According to the invention I provide cis and trans isomers of alkene derivatives of the formula:

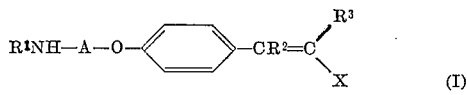

(I)

wherein $R^1$ stands for an alkyl radical of not more than 6 carbon atoms, A stands for an alkylene radical, $R^2$ and $R^3$, which may be the same or different, stand for phenyl radicals optionally bearing one or more substituents selected from halogen atoms, and alkyl and alkoxy radicals, and X stands for a halogen atom, and the acid-addition salts thereof.

It is to be understood that in this specification the term "trans isomer" means a compound of the formula:

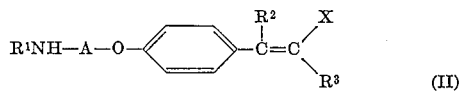

(II)

wherein $R^1$, $R^2$, $R^3$, X and A have the meanings stated above, and wherein the phenyl radicals $R^2$ and $R^3$ are in the trans relationship to each other across the olefinic bond. Similarly, the term "cis isomer" means the compound of the formula:

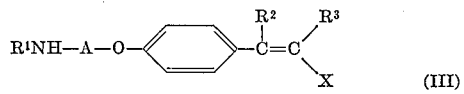

(III)

wherein $R^1$, $R^2$, $R^3$, X and A have the meanings stated above, and wherein the phenyl radicals $R^2$ and $R^3$ are in the cis relationship to each other across the olefinic bond.

As a suitable value for $R^1$ there may be mentioned, for example, the methyl or ethyl radical.

As a suitable value for A there may be mentioned, for example, a straight- or branched-chain alkylene radical of not more than 6 carbon atoms, for example the ethylene or trimethylene radical.

As a suitable value for $R^2$ or $R^3$ there may be mentioned, for example, the phenyl radical, optionally bearing one or more substituents selected from chlorine and bromine atoms, and alkyl and alkoxy radicals of not more than 6 carbon atoms, for example methyl, ethyl and methoxy radicals.

As a suitable value for X there may be mentioned, for example, the chlorine or bromine atom.

Specific alkene derivatives of the invention are, for example, 1 - p-(2-methylaminoethoxy)phenyl-trans-1,2-diphenyl - 2 - bromoethylene, 1 - p - (2-ethylaminoethoxy)-phenyl-trans-1,2-diphenyl-2-chloroethylene, 1-p-(2 - ethylaminoethoxy)phenyl - cis - 1,2 - diphenyl - 2 - chloroethylene 1-p-(3-methylaminopropoxy)phenyl-cis-1-p-tolyl-2-p-chlorophenyl-2-chloroethylene, and the acid-addition salts thereof.

As suitable acid-addition salts of the alkene derivatives of the invention there may be mentioned, for example, salts with hydrochlortic, acetic, tartaric, oxalic or citric acid.

According to a further feature of the invention I provide a process for the manufacture of the cis and trans isomers of the invention which comprises the replacement by hydrogen of a protecting group (P) in a compound of the formula:

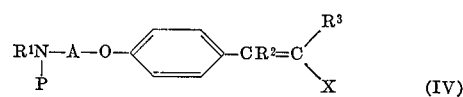

(IV)

wherein $R^1$, $R^2$, $R^3$, X and A have the meanings stated above, and P stands for an alkoxycarbonyl or arylsulphonyl radical, followed by separation, if necessary, of the product so that a substantially pure cis isomer or a substantially pure trans isomer is obtained.

It is to be understood that the starting material in the above process may itself consist of a substantially pure cis or a substantially pure trans isomer, and in which case the product will consist of a substantially pure cis or trans isomer, and no further separation is necessary.

As a suitable value for P when it stands for an alkoxycarbonyl radical there may be mentioned, for example, an alkoxycarbonyl radical of not more than 6 carbon atoms, for example the ethoxycarbonyl radical. As a suitable value for P when it stands for an arylsulphonyl radical there may be mentioned, for example, a phenylsulphonyl radical optionally substituted by one or more alkyl radicals of not more than 3 carbon atoms, for example the p-toluenesulphonyl radical.

The means used to replace the protecting group (P) by hydrogen in the above process are dependent upon the nature of the protecting group. Thus when P stands for an alkoxycarbonyl radical, the replacement may be effected by alkaline hydrolysis, for example hydrolysis using an alkali metal hydroxide, for example sodium or potassium hydroxide. The hydrolysis may be carried out in a diluent or solvent, for example n-butanol, and it may be accelerated or completed by the application of heat. When P stands for an arylsulphonyl radical, the replacement may be carried out by the interaction of the protected compound with a concentrated solution of hydrogen bromide in a lower aliphatic carboxylic acid in the presence of a compound capable of reacting rapidly with bromine, for example a 30% solution of hydrogen bromide in acetic acid in the presence of phenol. The interaction may be conveniently carried out at ambient temperature.

The separation may be carried out by methods known to the art for the separation of mixture of cis and trans isomers. Thus, for example, the separation can be carried out by fractional crystallisation, which may be carried out in, for example, one or more organic solvents, for example methanol, isopropanol, ethyl acetate, acetone or petroleum ether, or mixtures thereof. Alternatively, the separation can be carried out by chromatography.

The compounds of the Formula IV, wherein $R^1$, $R^2$, $R^3$, P, X and A have the meanings stated above, used as starting materials, may be obtained, for example, by the halogenation of a compound of the formula:

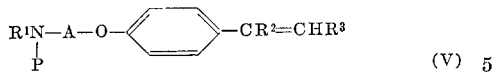

wherein $R^1$, $R^2$, $R^3$, P and A have the meanings stated above.

Those of the compounds of the Formula IV used as starting materials, wherein P stands for an alkoxycarbonyl radical and $R^1$, $R^2$, $R^3$, X and A have the meanings stated above, may be obtained, for example, by the interaction of a compound of the formula:

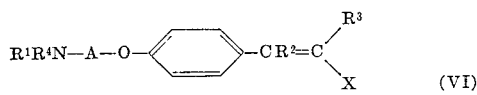

wherein $R^1$, $R^2$, $R^3$, X and A have the meanings stated above, and $R^4$ stands for an alkyl radical of not more than 6 carbon atoms, with a halogeno compound of the formula P—X, wherein P stands for an alkoxycarbonyl radical, and X has the meaning stated above.

The compounds of the Formula V may be obtained from the corresponding dialkylaminoalkoxy derivatives by reaction with an alkoxycarbonyl halide, or by dehydration of the corresponding ethanol derivative.

The cis and trans isomers of the invention modify the reproductive endocrine status in mammalian species. They are active by parenteral administration and by mouth. The cis compounds are oestrogenic as indicated, for example, by their effects upon the vaginal smear or uterine weight in immature and/or ovariectomized rats or mice. They are capable of terminating early pregnancy in rats by preventing implantation of the fertilized ova, but for this effect they need to be given in doses of the order of those which produce oestrogenic effects. Their action on implantation is a manifestation of their oestrogenic activity.

In contrast to the cis, the trans isomers of the invention are only weakly and atypically oestrogenic and have demonstrable anti-oestrogenic activity. They too are capable of terminating early pregnancy in rats by preventing implantation, but will do so at doses well below those required to produce oestrogenic effects. They are capable of preventing implantation by virtue of their anti-oestrogenic activity.

The trans isomers of the invention are considered to be of particular value in those clinical conditions where anti-oestrogenic action would be beneficial, for example, in the management of certain aberrations of the menstrual cycle and for preventing ovo-nidation without causing oestrogenic side effects.

Since the cis and trans isomers are not equivalent in their biological properties, it is evident that reliable clinical effects can only be secured by the use of a substantially pure cis or trans isomer.

According to a further feature of the invention, therefore, I provide pharmaceutical compositions which comprise at least one of the cis or trans isomers of the invention and a nontoxic, pharmaceutically-acceptable, inert diluent or carrier therefor.

The pharmaceutical compositions of the invention may be in a form suitable for oral or parenteral use. Compositions suitable for oral use may be, for example, in the form of tablets, capsules, solutions or suspensions in aqueous media or in non-toxic organic liquid media, or dispersible powders suitable for the preparation of liquid suspensions. Compositions suitable for parenteral use may be, for example, in the form of sterile solutions or suspensions in aqueous media or in non-toxic organic liquid media, or sterile dispersible powders suitable for the preparation of sterile liquid suspensions.

The said pharmaceutical compositions may contain excipients known to the art to be useful in the preparation of such compositions, for example wetting, dispersing, suspending lubricating, sweetening flavouring and/or colouring agents.

The oral compositions may be in the form of tablets wherein the inert diluent or carrier is, for example, maize starch, lactose or alginic acid. There may also be present one or more wetting agents, for example an alkali metal salt of a sulphonated dialkyl-naphthalene, for example the sodium salt of sulphonated di-isopropylnaphthalene, and one or more lubricating agents, for example magnesium stearate. The said tablets may contain between 1 mg. and 500 mg. of active ingredient, and preferably between 10 and 50 mg. per tablet.

The invention is illustrated but not limited by the following examples in which the parts are by weight:

EXAMPLE 1

2.5 parts of 1 - p - [2 - (N - ethoxycarbonyl - N - methylamino)ethoxy]phenyl - trans - 1,2 - diphenyl - 2 - bromoethylene are added to a solution of 2.5 parts of potassium hydroxide in 50 parts of n-butanol, and the whole is heated under reflux for 16 hours. The mixture is then cooled, filtered and the solid retained. The filtrate is evaporated, and the residue is combined with the solid retained above. This mixture is stirred with water, and the suspension is extracted with ether. The ethereal extract is dried and evaporated, and the residue is stirred with 2 N-hydrochloric acid and re-extracted with methylene chloride. This latter extract is dried and evaporated, the residue is washed with ethyl acetate and crystallised from isopropanol. There is thus obtained 1-p-(2-methylaminoethoxy)phenyl - trans - 1,2 - diphenyl - 2 - bromoethylene hydrochloride, M.P. 208–210° C.

The 1 - p - [2 - (N - ethoxycarbonyl - N - methylamino)ethoxy]phenyl - trans - 1,2 - diphenyl - 2 - bromoethylene, used as starting material may be prepared as follows:

A mixture of 3.7 parts of 1-p-(2-dimethylaminoethoxy)-phenyl-trans-1,2-diphenyl-2-bromoethylene, 2.85 parts of ethyl chloroformate and 50 parts of benzene is heated under reflux for 12 hours. The solution is then cooled and evaporated, and the residue washed with petroleum ether (B.P. 40–60° C.). There is thus obtained 1-p-[2-(N-ethoxycarbonyl - N - methylamino)ethoxy]phenyl - trans - 1,2 diphenyl-2-bromoethylene, M.P. 82–84° C., which is used without further purification.

The 1 - p - (2 - dimethylaminoethoxy)phenyl - trans - 1,2-diphenyl-2-bromoethylene is obtained as follows:

4.2 parts of a mixture of the cis and trans isomers of 1 - p - (2 - dimethylaminoethoxy)phenyl - 1,2 - diphenyl - 2 - bromoethylene are stirred together with petroleum ether (B.P. 40–60° C.). The insoluble material is filtered off, and crystallised from petroleum ether (B.P. 80–100° C.). There is thus obtained 1-p-(2-dimethylaminoethoxy)-phenyl - trans - 1,2 - diphenyl - 2 - bromoethylene, M.P. 116–118° C.

The mixture of cis and trans isomers used as starting material, M.P. 108–110° C., may be obtained as follows:

3.5 parts of 1-(p-hydroxyphenyl)-1,2-diphenyl-2-bromotheylene are dissolved in a solution of 0.23 part of sodium in 50 parts of methanol. The solution is evaporated to dryness and the residue is stirred and heated under reflux with a solution of 2.14 parts of β-dimethylaminoethyl chloride in 100 parts of benzene for 16 hours. The mixture is cooled and filtered, and the filtrate is evaporated under reduced pressure. There is thus obtained 1-p - (2 - dimethylaminoethoxy)phenyl - 1,2 - diphenyl - 2 - bromoethylene, M.P. 108–110° C.

EXAMPLE 2

The procedure described in Example 1 is repeated except that the 3.7 parts of 1-p-(2-dimethylaminoethoxy) phenyl-trans-1,2-diphenyl-2-bromoethylene are replaced by 8.4 parts of a mixture of the cis and trans isomers of 1-p-(2-diethylaminoethoxy)phenyl-1,2-diphenyl - 2 - chloroethylene. There is thus obtained 1-p-(2-ethylaminoethoxy)phenyl-trans-1,2-diphenyl-2-chloroethylene hydrochloride, M.P. 216–218° C. by way of a mixture of the cis and trans isomers of 1-p-[2-(N-ethoxycarbonyl-N-methylamino)ethoxy]phenyl-1,2-diphenyl-2-chloroethylene, which is obtained as a gum.

The mother liquors from the crystallisation of the trans isomer, M.P. 216–218° C., above are evaporated, and the residue is recrystallised from isopropanol. There is thus obtained 1-p-(2-ethylaminoethoxy)phenyl - cis - 1,2 - diphenyl-2-chloroethylene hydrochloride, M.P. 192–194° C.

EXAMPLE 3

A solution of 13 parts of 1-p-[3-(N-ethoxycarbonyl-N-methylamino)propoxy]phenyl-1-p-tolyl - 2 - p - chlorophenyl-2-chloroethylene in 300 parts of n-butanol containing 13 parts of potassium hydroxide is heated under reflux for 16 hours. The mixture is then cooled and the solvent evaporated. The residue is extracted with ether and the ethereal solution washed with water, dried and evaporated. The residue is converted to its hydrochloride by trituration with N-hydrochloric acid, and the mixture is extracted with methylene dichloride. The extract is dried and evaporated, and the residue is triturated with ether. The solid is formed is filtered off and recrystallised from isopropanol. There is thus obtained 1-p-(3-methylaminopropoxy)phenyl-cis-1-p-tolyl-2-p - chlorophenyl - 2-chloroethylene hydrochloride, M.P. 220-222° C.

The 1-p-[3-(N-ethoxycarbonyl - N - methylamino)propoxy]-phenyl-1-p-tolyl-2-p-chlorophenyl - 2 - chloroethylene used as starting material is obtained as follows:

12.85 parts of a mixture of the cis and trans isomers of 1-p-(3-dimethylaminopropoxy)phenyl-1-p-tolyl - 2 - p-chlorophenyl-2-chloroethylene are added to a solution of 9.5 parts of ethyl chloroformate in 200 parts of benzene, and the whole is heated under reflux for 16 hours. The mixture is cooled and the solvent is evaporated. The residue is dissolved in a mixture of benzene and ether, and the solution washed with N-hydrochloric acid. The organic phase is separated, dried and evaporated to give 1-p-[3-(N-ethoxycarbonyl - N - methylamino)propoxy]phenyl-1-p-tolyl-2-p-chlorophenyl-2-chloroethylene as an oil suitable for use without further purification.

The 1-p-(3-dimethylaminopropoxy)phenyl-1 - p - tolyl-2-p-chlorophenyl-2-chloroethylene is obtained as follows:

45 parts of 4-hydroxy-4'-methylbenzophenone are dissolved in a solution of 4.9 parts of sodium in methanol, and the resulting solution is evaporated to dryness to give the sodium salt. A solution of 3-dimethylaminopropyl chloride in benzene is prepared by the addition of 10 N-sodium hydoxide solution to an aqueous solution of 67 parts of 3-dimethylaminopropyl chloride hydrochloride, and then extracting the mixture with a total of 450 parts of benzene. The benzene solution is dried with potassium hydroxide, and then added to the sodium salt prepared as above. The mixture is then stirred and heated under reflux for 16 hours. The mixture is then cooled and filtered, and the filtrate evaporated. The residue is dissolved in 2 N-hydrochloric acid, the solution treated with charcoal and filtered, and the filtrate made strongly alkaline with 10 N-sodium hydroxide solution. The resulting mixture is extracted three times with ether; the extracts are combined, dried and evaporated, and the residue is distilled. There is thus obtained 4-(3-dimethylaminopropoxy)-4'-methylbenzophenone, B.P. 180° C./0.1 mm.

A solution of 48 parts of this latter benzophenone derivative in 250 parts of dry ether is added dropwise during 1 hour to the Grignard reagent prepared from 32.6 pats of p-chlorobenzyl chloride and 4.85 parts of magnesium in 300 parts of ether at ambient temperature. During the addition, the temperature of the reaction mixture rises, and the ether is allowed to reflux. After the addition is complete, the mixture is heated under reflux for 3 hours. The mixture is then cooled, and a solution of 200 parts of ammonium chloride in 500 parts of water is added. The ethereal phase is separated, and the aqueous phase is extracted twice, each time with 100 parts of ether.

The ethereal solutions are combined, dried and evaporated, and the residue is dissolved in 500 parts of 2 N-acetic acid solution. This acidic solution is extracted twice with 250 parts of ether, and the aqueous phase is made alkaline by the addition of 10 N-sodium hydroxide solution. The alkaline solution is extracted with ether, and the ethereal extract is dried and evaporated. The residual solid is recrystallised from petroleum ether (B.P. 80–100° C.) to give 1-p-(3-dimethylaminopropoxy)phenyl-1-p-tolyl-2-p-chlorophenylethanol, M.P. 78–80° C.

20 parts of this latter ethanol derivative is dissolved in 125 parts of ethanol containing 15 parts of concentrated hydrochloric acid, and the mixture is heated under reflux for 3 hours. The solution is then cooled and evaporated to dryness. The residue is triturated with ethyl acetate and there is thus obtained a mixture of the cis and trans isomers of 1-p-(3-dimethylaminopropoxy)phenyl-1-p-tolyl-2-p-chlorophenylethylene hydrochloride. Recrystallisation of this product from isopropanol gives the corresponding cis isomer as its hydrochloride, M.P. 216–218° C.

A solution of 10.75 parts of the mixture of cis and trans isomers obtained above, and 4.85 parts of N-chlorosuccinimide in 100 parts of chloroform is heated under reflux for 16 hours. The mixture is cooled, and the chloroform solution is washed twice with 100 parts of 10% w./v. sodium hydroxide solution and once with 100 parts of water. The chloroform solution is then dried and evaporated. The residue oil is triturated with 100 parts of 2 N-hydrochloric acid and the mixture extracted with methylene dichloride. The extract is dried and evaporated, and the residue is triturated with ethyl acetate. There is thus obtained a mixture of the cis and trans isomers of 1-p-(3-dimethylaminopropoxy)phenyl-1-p - tolyl - 2 - p-chlorophenyl-2-chloroethylene hydrochloride.

Recrystallization of this product from acetone gives the corresponding trans isomer as its hydrochloride, M.P. 193–194° C.

EXAMPLE 4

A mixture of 5.2 parts of 1-p-[2(N-ethyl-N-p-toluenesulphonylamino)ethoxy]phenyl - 1,2 - diphenyl-2-chloroethylene, 1.8 parts of phenol and 21 parts of a 30% solution of hydrogen bromide in acetic acid is kept for 20 hours at ambient temperature. 100 parts of ether are added to the resulting solution, and the ethereal solution is washed with 150 parts of 2 N-sodium hydoxide solution. The ethereal phase is separated and extracted three times with 50 parts of 2 N-acetic acid. The acetic acid extracts are combined and made strongly alkaline by the addition of 10 N-sodium hydroxide solution. The liberated oil is extracted with ether, and the extract is dried and evaporated. The residual oil is slurried with 2 N-hydrochloric acid, and the crude hydrochloride thus obtained is extracted with methylene dichloride. The extract is dried and evaporated and the residue is triturated with ethyl acetate. There is thus obtained a mixture of the cis and trans isomers of 1-p-(2-ethylaminoethoxy)-phenly-1,2-diphenyl-2-chloroethylene hydrochloride. The mixture of hydrochlorides is crystallised from isopropanol and there is obtained the trans isomer M.P. 216–218° C., and from the mother liquors there is obtained material enriched with the cis isomer.

The 1-p - [2(N - ethyl - N - p - toluenesulphonylamino)-ethoxy]phenyl-1,2-diphenyl-2-chloroethylene used as starting material is prepared as follows:

57 parts of p-toluenesulphonyl chloride are added during 1.5 hours to 107 parts of vigorously stirred 2-ethylaminoethanol at 30–35° C. The mixture is heated at 70° C. for 1 hour, and then cooled and poured into 500 parts of ice-water. The mixture is extracted with chloroform, and the extract is washed twice with 300 parts of 2 N-hydrochloric acid, twice with 300 parts of saturated sodium chloride solution and twice with 300 parts of water. The chloroform solution is then dried and evaporated and the residue crystallised from a mixture of benzene and petroleum ether (B.P. 60–80° C.). There is thus obtained N-ethyl-N-(2-hydroxyethyl)-p-toluenesulphonamide, M.P. 62–64° C.

15 parts of this sulphonamide are dissolved in 100 parts of dry benzene and 20 parts of phosphorus tribromide are added dropwise during 0.5 hour at ambient temperature. The mixture is then heated at 80° C. for 2 hours, cooled and poured into ice-water. The benzene layer is separated and the aqueous layer extracted with benzene. The benzene solutions are combined, dried and evaporated, and the residue is distilled to give N-ethyl-N-(2-bromethyl)-p-toluenesulphonamide, B.P. 158–160° C. at 0.2 mm., M.P. 6–70° C.

6.3 parts of the above bromo compound are added to a suspension in 50 parts of xylene of the sodium salt derived from 4.36 parts of 4-hydroxydesoxybenzoin. The mixture is heated under reflux for 16 hours, cooled, filtered and the xylene evaporated. The residue is dissolved in 100 parts of benzene and the resulting solution is washed with 100 parts of 2 N-sodium hydroxide solution, dried and evaporated. The residue is crystallised from methanol to give 4-[2(N-ethyl-N-p-toluenesulphonylamino)ethoxy]desoxybenzoin, M.P. 90–92° C.

A solution of 21.85 parts of the above desoxybenzoin derivative in 125 parts of tetrahydrofuran is added at 30° C. to the Grignard reagent prepared from 2.4 parts of magnesium and 15.7 parts of bromobenzene in 250 parts of ether. The mixture is heated under reflux for 3 hours, cooled, and the resulting complex is decomposed with a solution of 75 parts of ammonium chloride in 250 parts of water. The organic phase is separated and the aqueous phase is extracted three times with 100 parts of ether. The extracts are combined with the organic phase, dried and evaporated. The residue is triturated with petroleum ether (B.P. 80–100° C.) and the solid so obtained is crystallised from methanol to give 1-p-[2-(N-ethyl - N - p - toluenesulphonylamino)ethoxy]phenyl-1,2-diphenylethanol, M.P. 96–98° C.

A mixture of 5.15 parts of the above ethanol derivative, 5 parts of concentrated hydrochloric acid and 40 parts of ethanol is heated under reflux for 3 hours. The ethanol is then evaporated to give a mixture of the cis and trans isomers of 1-p-[2(N-ethyl-N-p-toluenesulphonoylamino)-ethoxy]phenyl-1,2-diphenylethylene as an oil.

1.2 parts of N-chlorosuccinimide are added to a solution of 3.0 parts of the above ethylene derivative in 50 parts of chloroform, and the whole is heated under reflux for 20 hours. The solution is cooled, washed once with 50 parts of 2.5 N-sodium hydroxide solution and then twice with 50 parts of water. The chloroform solution is then dried and evaporated to give a mixture of the cis and trans isomers of 1-p-[2(N-ethyl-N-p-toluenesulphonylamino)ethoxy]phenyl-1,2-diphenyl-2-chloroethylene as an oil.

EXAMPLE 5

The process described in the first part of Example 4 is repeated except that the 1-p-[2(N-ethyl-N-p-toluenesulphonylamino)ethoxy]phenyl - 1,2 - diphenyl-2-chloroethylene is replaced by 1-p-[2-(N-methyl-N-p-toluenesulphonylamino)ethoxy]phenyl - 1,2 - diphenyl - 2 - bromo ethylene. There is thus obtained a mixture of the cis and trans isomers of 1,-p-(2-methylaminoethoxy)phenyl-1,2-diphenyl-2-bromoethylene hydrochloride, which is recrystallised from isopropanol to give the trans isomer as a hydrochloride, M.P. 208–210° C.

The bromoethylene derivative used as starting material may be prepared as follows:

A solution of 1.33 parts of bromine in 15 parts of chloroform is added dropwise during 15 mins. to a solution of 4.15 parts of 1-p-[2(N-methyl-N-p-toluenesulphonylamino)ethoxy]phenyl-1,2-diphenylethanol in 40 parts of chloroform in the presence of a small quantity of granular calcium sulphate. The mixture is stirred at ambient temperature for 2 hours, and then filtered, washed once with 50 parts of water, twice with 50 parts of 5% sodium carbonate solution and twice with 50 parts of water. The resulting chloroform solution is dried and evaporated, and the residue is crystallised from a mixture of benzene and petroleum ether (B.P. 40–60° C.). There is thus obtained 1-p-[2(N-methyl-N-p-toluenesulphonylamino)ethoxy]phenyl - 1,2 - diphenyl - 2 - bromoethylene, M.P. 76–78° C.

The 1-p-[2(N-methyl - N - p - toluenesulphonylamino) ethoxy]phenyl-1,2-diphenylethanol, M.P. 128–130° C., used as starting material in the above reaction may be obtained by the process described in Example 4 for the preparation of the corresponding N-ethyl derivative except that the 2-ethylaminoethanol is replaced by 2-methylaminoethanol.

EXAMPLE 6

50 parts of 1-p-(2-ethylaminoethoxy)phenyl-trans-1,2-diphenyl-2-chloroethylene hydrochloride, 42 parts of maize starch and 7 parts or alginic acid are intimately mixed and granulated using 10% maize starch paste as the granulating agent. The granules are dried at a temperature not exceeding 50° C., then mixed with 1 part of magnesium stearate and compressed into tablets each weighing 50 mg. which are suitable for oral administration.

The 1-p-(2-ethylaminoethoxy) phenyl - trans - 1,2 - diphenyl-2-chloroethylene hydrochloride used as active ingredient in the above tablets may be replaced by any of the cis or trans isomers described in Examples 1–5.

When given to pregnant rats on the 2nd, 3rd and 4th day after insemination the trans isomers prevent implantation in daily oral doses of ca. 0.025 mg. per kg. bodyweight. In ovariectomized rats they do not exhibit significant oestrogenic activity in daily oral doses (for 3 days) below 10 mg. per kg. body-weight. Under the same conditions of test, the cis isomers do not prevent implantation in daily oral doses below ca. 0.5 mg. per kg. body-weight. At this and higher levels of dosage they prevent implantation but also exhibit oestrogenic activity.

What I claim is:

1. A compound selected from a trans isomer of an alkene derivative of the formula:

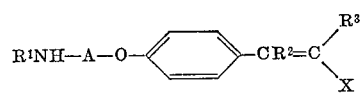

wherein $R^1$ is methyl or ethyl, A is ethylene or trimethylene, $R^2$ and $R^3$ are selected from the group consisting of phenyl, chlorophenyl, tolyl and methoxyphenyl, and X is chlorine or bromine, and the pharmaceutically-acceptable, acid-addition salts thereof.

2. A compound according to claim 1 selected from the group consisting of 1-p-(2-methylaminoethoxy)-phenyl-trans-1,2-diphenyl-2-bromoethylene, and the pharmaceutically-acceptable acid-addition salts thereof.

3. A compound according to claim 1 selected from the group consisting of 1-p-(2 - ethylaminoethoxy)-phenyl-trans-1,2-diphenyl-2-chloroethylene, and the pharmaceutically-acceptable acid-addition salts thereof.

References Cited

FOREIGN PATENTS 100,243    1/1962    Netherlands.
1,155,436   10/1963   Germany.

ROBERT V. HINES, Primary Examiner

U.S. Cl. X.R.

260—471, 556, 570, 591, 592, 618; 424—330